US012743806B2

(12) United States Patent
Kitajima et al.

(10) Patent No.: US 12,743,806 B2
(45) Date of Patent: Sep. 22, 2026

(54) POSITION ESTIMATING DEVICE, FORKLIFT, POSITION ESTIMATING METHOD, AND NON-TRANSITORY COMPUTER READABLE STORAGE MEDIUM STORING PROGRAM

(71) Applicant: Mitsubishi Logisnext Co., Ltd., Nagaokakyo (JP)

(72) Inventors: Katsumasa Kitajima, Tokyo (JP); Yusuke Kinouchi, Tokyo (JP); Masahiro Yamada, Tokyo (JP); Takumi Fujita, Tokyo (JP); Takuya Akashi, Nagaokakyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 161 days.

(21) Appl. No.: 18/380,542

(22) Filed: Oct. 16, 2023

(65) Prior Publication Data

US 2024/0135573 A1 Apr. 25, 2024
US 2024/0233166 A9 Jul. 11, 2024

(30) Foreign Application Priority Data

Oct. 20, 2022 (JP) ................................ 2022-168604

(51) Int. Cl.
*G06T 7/70* (2017.01)
*G06T 3/40* (2024.01)
*G06V 20/56* (2022.01)

(52) U.S. Cl.
CPC .................. *G06T 7/70* (2017.01); *G06T 3/40* (2013.01); *G06V 20/56* (2022.01); *G06T 2207/30204* (2013.01); *G06T 2207/30252* (2013.01)

(58) Field of Classification Search
CPC ... G06T 7/70; G06T 3/40; G06T 2207/30204; G06T 2207/30252; G06T 2207/10016;
(Continued)

(56) References Cited

U.S. PATENT DOCUMENTS 5,852,791 A 12/1998 Sato et al.
2019/0080190 A1* 3/2019 Shieh .................... G06V 20/46
(Continued)

FOREIGN PATENT DOCUMENTS

CN 112106003 A 12/2020
JP 9-178498 A 7/1997
(Continued)

OTHER PUBLICATIONS

Das et al., "Real-Time Vehicle Positioning and Mapping Using Graph Optimization," Sensors, vol. 21, No. 8, Apr. 16, 2021, XP093397848, pp. 1-23.

(Continued)

*Primary Examiner* — Oneal R Mistry
*Assistant Examiner* — Justin Philip Cascais
(74) *Attorney, Agent, or Firm* — Birch, Stewart, Kolasch & Birch, LLP

(57) ABSTRACT

A position estimating device is a position estimating device that estimates a position of a vehicle equipped with a camera and includes a position estimating unit configured to estimate the position of the vehicle by image processing of an image captured by the camera and a load control unit configured to control a processing load of the image processing by controlling an execution timing of the image processing performed by the position estimating unit and/or the image to be subjected to the image processing.

5 Claims, 8 Drawing Sheets

(58) Field of Classification Search
CPC ........ G06T 2207/30244; G06T 1/0007; G06V 20/56; B66F 9/0755
See application file for complete search history.

(56) References Cited

U.S. PATENT DOCUMENTS

2020/0034982 A1 1/2020 Nishimura et al.
2021/0027486 A1* 1/2021 Kaino ........................ G06T 7/73
2021/0261136 A1 8/2021 Kameo et al.
2021/0263530 A1 8/2021 Kitajima et al.
2024/0012394 A1* 1/2024 Oh ........................ G06T 7/0004

FOREIGN PATENT DOCUMENTS

JP H11-29299 A 2/1999
JP 2005-274506 A 10/2005
JP 2012-208877 A 10/2012
JP 2018-9918 A 1/2018
JP 2019-27983 A 2/2019
JP 2020-16968 A 1/2020
JP 2020-134486 A 8/2020
JP 2022-22715 A 2/2022
JP 2022-034861 A 3/2022
JP 2022-95273 A 6/2022
KR 10-2011-0027460 A 3/2011
WO WO-2024009377 A1 * 1/2024 ............... G06T 7/73

OTHER PUBLICATIONS

European Communication pursuant to Article 94(3) EPC for European Application No. 23 203 752.3, dated May 22, 2026.
Chinese Office Action issued Jul. 16, 2026 in Chinese Application No. 202311336398.1.

* cited by examiner

POSITION ESTIMATING DEVICE, FORKLIFT, POSITION ESTIMATING METHOD, AND NON-TRANSITORY COMPUTER READABLE STORAGE MEDIUM STORING PROGRAM

CROSS-REFERENCE TO RELATED APPLICATIONS

This application claims the benefit of priority to Japanese Patent Application Number 2022-168604 filed on Oct. 20, 2022. The entire contents of the above-identified application are hereby incorporated by reference.

TECHNICAL FIELD

The disclosure relates to a position estimating device, a forklift, a position estimating method, and a program.

RELATED ART

JP 2022-22715 A discloses a position estimating method including capturing an image of the surroundings by a camera installed at a forklift, extracting a feature point from the captured image, and estimating its own position by collating the extracted feature point with a map generated in advance. In this position estimation processing, the angular speed of the forklift is monitored, and when the angular speed exceeds a threshold value, it is determined that there is a high possibility that images captured during that time are blurred and cannot be used for the position estimation, and these images are not used for the position estimation processing. According to this method, since the number of images used for the position estimation can be reduced, the computational load can be reduced.

A mobile body such as a forklift is not always supplied with power from the outside, and thus it is necessary to suppress power consumption as much as possible. Further, to suppress the manufacturing cost of the forklift, it is difficult to mount expensive computing machinery that can withstand a heavy computational load. However, each image has a large volume of data, and image processing such as feature point extraction for positioning has a heavy computational load and large power consumption. According to the technique of JP 2022-22715 A, it is possible to reduce consumed power by excluding images from which feature points cannot be normally extracted. However, of images captured during traveling of the forklift, only a few images are captured in a state in which the angular speed exceeds the threshold value, and the effect of reducing consumed power is considered to be limited.

SUMMARY

Regarding position estimation using an image, a technique for efficiently reducing power consumption while ensuring estimation accuracy is demanded.

The disclosure provides a position estimating device, a forklift, a position estimating method, and a program that are capable of solving the above problems.

A position estimating device according to the disclosure is a position estimating device that estimates a position of a vehicle equipped with a camera and includes a position estimating unit configured to estimate the position of the vehicle by image processing of an image captured by the camera and a load control unit configured to control a processing load of the image processing by controlling an execution timing of the image processing performed by the position estimating unit and/or the image to be subjected to the image processing.

A forklift of the disclosure includes a camera and the above-described position estimating device.

A position estimating method according to the disclosure is a position estimating method of estimating a position of a vehicle equipped with a camera and includes controlling, when position estimation is performed by image processing of an image captured by the camera, a load of the image processing by controlling an execution timing of the image processing and/or the image to be subjected to the image processing and estimating the position of the vehicle by the image processing of the image based on control of the load.

A program according to the disclosure causes a computer that estimates a position of a vehicle equipped with a camera to function as a unit configured to estimate the position of the vehicle by image processing of an image captured by the camera and a unit configured to control a processing load of the image processing by controlling an execution timing of the image processing performed by the unit configured to estimate the position and/or the image to be subjected to the image processing.

According to the above-described position estimating device, forklift, position estimating method, and program, a technique for efficiently reducing power consumption while ensuring estimation accuracy is demanded regarding position estimation using an image.

BRIEF DESCRIPTION OF DRAWINGS

The disclosure will be described with reference to the accompanying drawings, wherein like numbers reference like elements.

DESCRIPTION OF EMBODIMENTS

Embodiments

Hereinafter, a method according to the disclosure for performing control so as to reduce a load of image processing in position estimation processing while ensuring the estimation accuracy of a position when performing position estimation using an image will be described with reference to the drawings.

Configuration of Forklift

Figure 1:
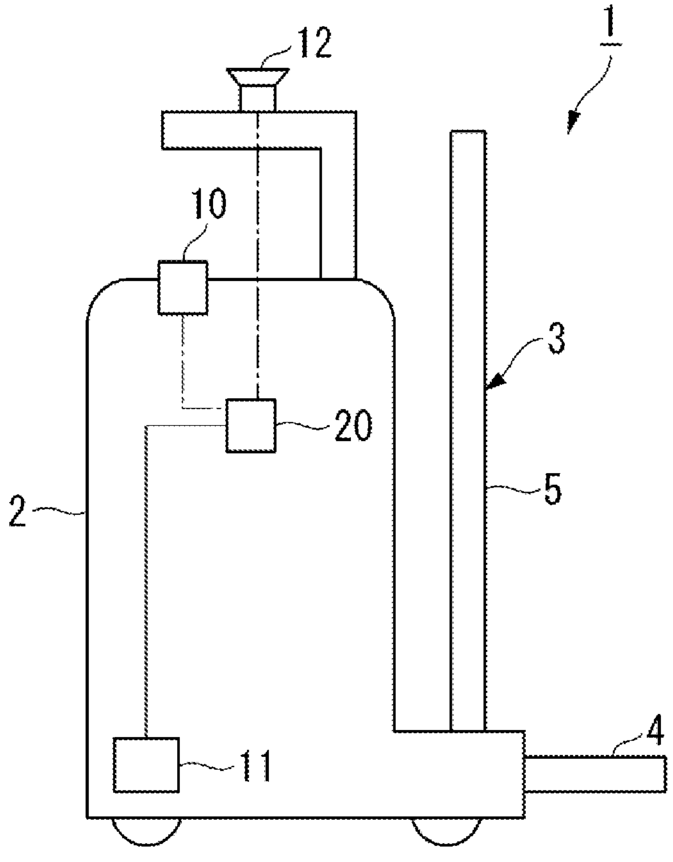
FIG. 1 is a schematic diagram illustrating an example of a forklift according to each embodiment.

FIG. 1 is a schematic diagram illustrating an example of a forklift according to each embodiment.

A forklift 1 includes a vehicle body 2, a cargo handling device 3, and a position estimating device 20. The vehicle body 2 includes tires, a drive device (not illustrated), and a steering device (not illustrated) and causes the forklift 1 to travel. The cargo handling device 3 includes a fork 4 and a mast 5 for lifting and lowering the fork 4 and performs a cargo handling operation by, for example, lifting and lowering a cargo loaded on the fork 4. The vehicle body 2 is provided with an IMU 10, an encoder 11, and a camera 12. The IMU 10 includes an accelerometer and a gyro sensor, and can detect a moving speed, acceleration, a moving direction, and a turning direction of the forklift 1. The encoder 11 is a rotary encoder that detects the rotational speed of a tire (for example, rear wheel) of the forklift 1. The movement of the forklift 1 can be detected based on the measurement value of the encoder 11. The camera 12 is directed upward of the vehicle body 2, and captures an image of a ceiling of a work area at all times during operation of the forklift 1.

Each sensor of the IMU 10, the encoder 11, the camera 12 is connected to the position estimating device 20, and the measurement value measured by each sensor is sent to the position estimating device 20. The position estimating device 20 includes a computer including a processor. The position estimating device 20 estimates the position of the forklift 1 by using the measurement value from each of the sensors described above.

Configuration of Position Estimating Device

Figure 2:
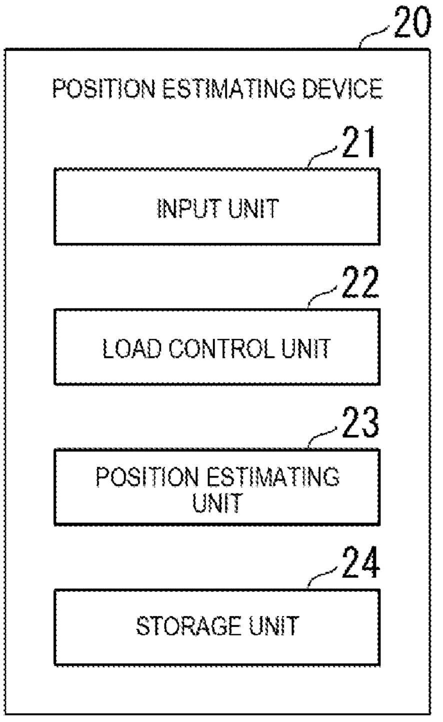
FIG. 2 is a diagram illustrating an example of a position estimating device according to each embodiment.

FIG. 2 is a diagram illustrating an example of the position estimating device according to each embodiment.

The position estimating device 20 estimates the traveling position of the forklift 1 based on the image captured by the camera 12 while the forklift 1 moves. As illustrated in FIG. 2, the position estimating device 20 includes an input unit 21, a load control unit 22, a position estimating unit 23, and a storage unit 24.

The input unit 21 acquires the measurement values measured by the IMU 10 and the encoder 11 and the image captured by the camera 12 and stores the acquired measurement values and image in the storage unit 24.

The load control unit 22 controls image processing performed in the position estimation using the image by the position estimating unit 23 described below so as to reduce the load of the image processing as much as possible while ensuring the accuracy of the position estimation. In the position estimation processing using the image, consumed power can be reduced as the number of processed images is reduced. On the other hand, the greater the change between the image processed one cycle before and the image processed this time, the higher the possibility that the position estimation fails (the difficulty in collation of image features increases, collation with an image other than the previous image is needed, and erroneous association occurs). Thus, when the change from the image processed one cycle before is expected to be large, the image is preferably processed at as high a frequency as possible. For example, in the case of the forklift including the camera directed to the ceiling, as the vehicle speed increases, the image change accompanying the movement of the vehicle body 2 increases. Thus, from the viewpoint of ensuring the accuracy of the position estimation, it is desirable to increase the processing frequency according to the vehicle speed. Thus, the load control unit 22 performs control so as to perform the image processing at an interval at which the load of the image processing does not unnecessarily increase and the accuracy of the position estimation can be maintained in an allowable range. For example, the load control unit 22 instructs the position estimating unit 23 to perform the image processing for positioning each time the forklift 1 travels a predetermined distance regardless of the speed of the forklift 1 (first embodiment). The predetermined distance is, for example, a longest possible distance within a range where the accuracy of the position estimation can be ensured.

Figure 3:
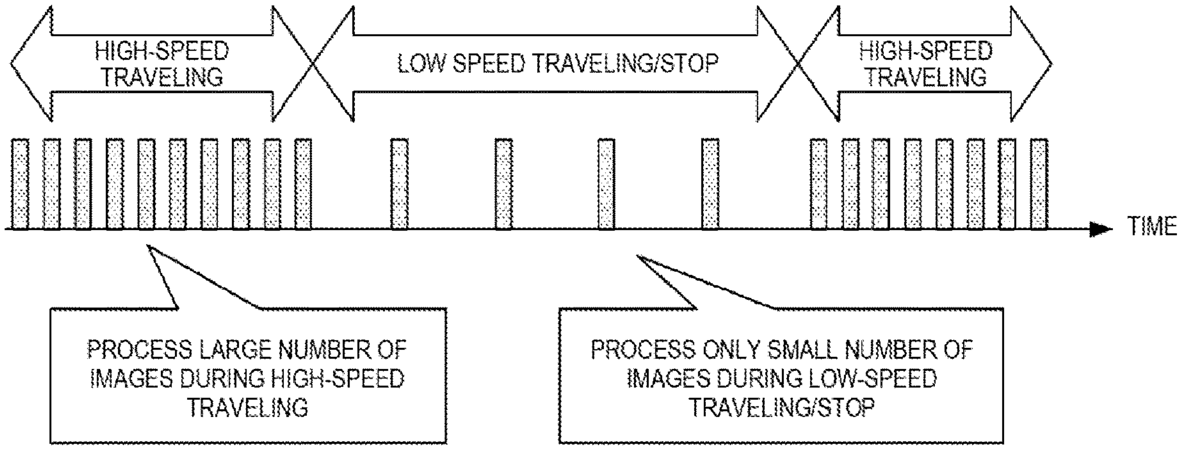
FIG. 3 is a diagram illustrating a relationship between a cycle of image processing and a mobile body according to each embodiment.

In addition, for example, the load control unit 22 instructs the position estimating unit 23 to perform the image processing for positioning at a cycle corresponding to the speed of the forklift 1 (second embodiment). For example, when the forklift 1 moves at a high speed, unless the image processing is performed at short time intervals, a region that does not change between the image processed one cycle before and the image processed this time (a region in which the same target range is imaged or an overlap region) becomes small, which may affect the accuracy of the position estimation. On the other hand, during low-speed movement of the forklift 1, an overlap region can be generated even when the processing is performed on the image captured at a certain time after capturing of the image processed one cycle before. In this case, even when the image processing is performed at a high frequency, the degree of improvement in the accuracy of the position estimation with respect to the increase in the load is not worth the processing cost. Thus, the load control unit 22 sets the processing frequency of the image processing to be high during high-speed movement of the forklift 1, and sets the processing frequency of the image processing to be low during low-speed movement of the forklift 1. FIG. 3 illustrates this state.

In addition, for example, the load control unit 22 may control the load of the image processing by adjusting the resolution of the image or the size of a region to be processed in the image (third embodiment). For example, when the forklift 1 moves at a low speed, since there is not much difference from the position estimated one cycle before, the processing may be performed with the resolution of the image reduced. For example, when the forklift 1 rotates at a high speed (when the angular speed is high), a peripheral portion of the image is blurred, and thus only the central portion of the image may be extracted and used as a processing target. Alternatively, during low-speed movement, since an overlap region with the image processed one cycle before is expected to be (unnecessarily) large, the region may be deleted (for example, only the central portion of the image is extracted) and the central portion may be used as a processing target.

For example, while performing the above-described load control, the load control unit 22 may reliably perform the position estimation using the image at a timing of approaching a marker provided on the ceiling as a mark for the position estimation and may perform the position estimation by collating the marker included in the captured image with map data to which information of the marker is added. Although an error may occur and may be accumulated in estimation without collation between the marker and the map data, it is possible to maintain the accuracy of the position estimation by reliably performing the map collation at a position where the marker is present (fourth embodiment).

The position estimating unit 23 performs the position estimation processing using the image. Specifically, the position estimating unit 23 extracts a feature point having an image feature such as a marker from the image captured by the camera 12, and collates the feature point with the map data in which the information of the marker is recorded in advance to estimate the position of the forklift 1 (Method 1). In addition, while generating a map from the feature point extracted as described above, the position estimating unit 23 performs the position estimation based on an image feature (image feature based on which a relative movement amount can be calculated by comparison with the image at the previous time, but an absolute position on the map cannot be identified by itself) using a visual simultaneous localization and mapping (V-SLAM) technique (Method 2). The position estimating unit 23 performs the position estimation by Method 1 and/or Method 2 based on an instruction from the load control unit 22. In addition to these two types of position estimation processing using the image, the position estimating unit 23 also performs position estimation by dead reckoning using the measurement values of the IMU 10 and the encoder 11 (Method 3). The position estimating unit 23 integrates the position estimation results obtained by Methods 1 to 3 using, for example, an extended Kalman filter or the like, calculates the final position information of the estimated position of the forklift 1, and outputs the estimated position information.

The storage unit 24 stores the measurement value of the encoder 11 acquired by the input unit 21 and the image captured by the camera 12. The storage unit 24 also stores the map data including the information of the marker and the map generated by the position estimating unit 23.

Operation

Next, processing for controlling the load of the image processing in the position estimation using the image by the position estimating unit 23 will be described with reference to FIGS. 4 to 7.

First Embodiment

Figure 4:
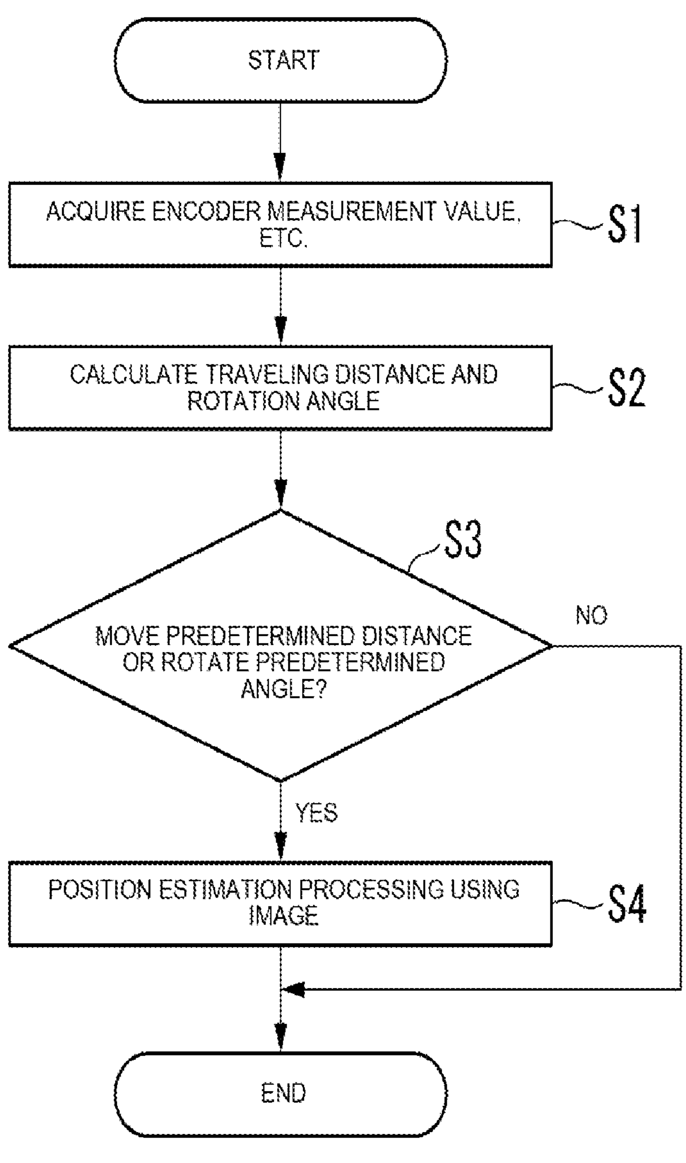
FIG. 4 is a flowchart illustrating an example of load control of image processing according to a first embodiment.

FIG. 4 is a flowchart illustrating an example of load control of image processing according to a first embodiment.

The position estimating device 20 repeatedly performs the following processing in a predetermined control cycle. The load control unit 22 reads and acquires the measurement values of the IMU 10 and the encoder 11 from the storage unit 24 (step S1). The load control unit 22 integrates the acceleration measured by the IMU 10 and converts the rotational speed of the tire measured by the encoder 11 into a distance to calculate the distance that the forklift 1 moves per unit time. The load control unit 22 also integrates the angular speed measured by the IMU 10 to calculate the rotation angle of the forklift 1 per unit time (step S2). Next, the load control unit 22 determines whether the forklift 1 moves a predetermined distance or rotates at a predetermined angle from the vehicle position and posture (traveling direction) estimated by performing the image processing in the position estimation one cycle before (step S3). Here, the predetermined distance and the predetermined angle are a longest possible distance and a largest possible angle within a range where positioning accuracy can be ensured. Information on the predetermined distance and the predetermined angle is registered in advance in the storage unit 24. When the determination in step S3 is Yes, the load control unit 22 instructs the position estimating unit 23 to perform the position estimation processing using an image. The position estimating unit 23 acquires the latest image captured by the camera 12 from the storage unit 24, performs the image processing, and performs the position estimation processing using the image (step S4). When the determination in step S3 is No, the load control unit 22 does not instruct the position estimating unit 23 to perform the position estimation processing using the image. Thus, the position estimation processing using the image is not performed in this control cycle, and the image processing accompanying the position estimation processing is not performed.

According to the first embodiment, it is possible to reduce power consumption while ensuring the estimation accuracy of the position. For example, since the position is estimated by performing the image processing at constant distance intervals, the estimation accuracy of the position can be maintained. In addition, for example, since the frequency of the image processing in the position estimation processing can be reduced as compared with the case where the image processing is performed at equal time intervals during low-speed movement of the forklift 1, power consumption can be reduced. Although both of the distance and the rotation angle are used in the description of FIG. 4, only one of them may be used.

Second Embodiment

Figure 5:
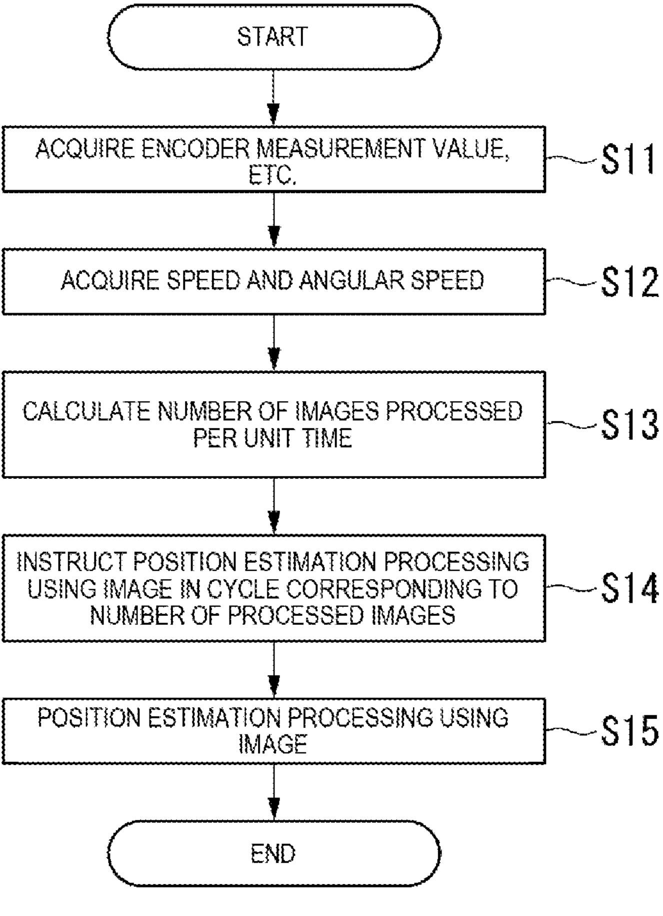
FIG. 5 is a flowchart illustrating an example of load control of image processing according to a second embodiment.

FIG. 5 is a flowchart illustrating an example of load control of image processing according to a second embodiment.

The position estimating device 20 repeatedly performs the following processing in a predetermined control cycle. The load control unit 22 reads and acquires the measurement values of the IMU 10 and the encoder 11 from the storage unit 24 (step S11). The load control unit 22 calculates the speed of the forklift 1 from the acceleration measured by the IMU 10 and the rotational speed of the tire measured by the encoder 11. In addition, the load control unit 22 acquires the angular speed measured by the IMU 10 (step S12). Next, the load control unit 22 calculates the number of processed images per unit time (step S13). For example, the load control unit 22 calculates the number of processed images by Equation 1 below.

$$\text{The number of processed images per unit time}=\alpha\times\text{the speed}+\beta\times\text{the angular speed} \quad (1)$$

Here, $\alpha$ and $\beta$ are any given coefficients, and when a value calculated by Equation 1 exceeds the maximum number of processed images, the load control unit 22 adopts the maximum number of processed images. Next, the load control unit 22 instructs the position estimating unit 23 to perform the position estimation processing using the image in a cycle corresponding to the calculated number of processed images (step S14). According to the execution instruction from the load control unit 22, the position estimating unit 23 acquires the latest image captured by the camera 12 from the storage unit 24 and performs the position estimation processing using the image (step S15).

This can increase the processing frequency during high-speed movement and decrease the processing frequency during low-speed movement, and thus it is possible to reduce the load and power consumption of the image processing in the position estimation processing while ensuring positioning accuracy.

Third Embodiment

Figure 6:
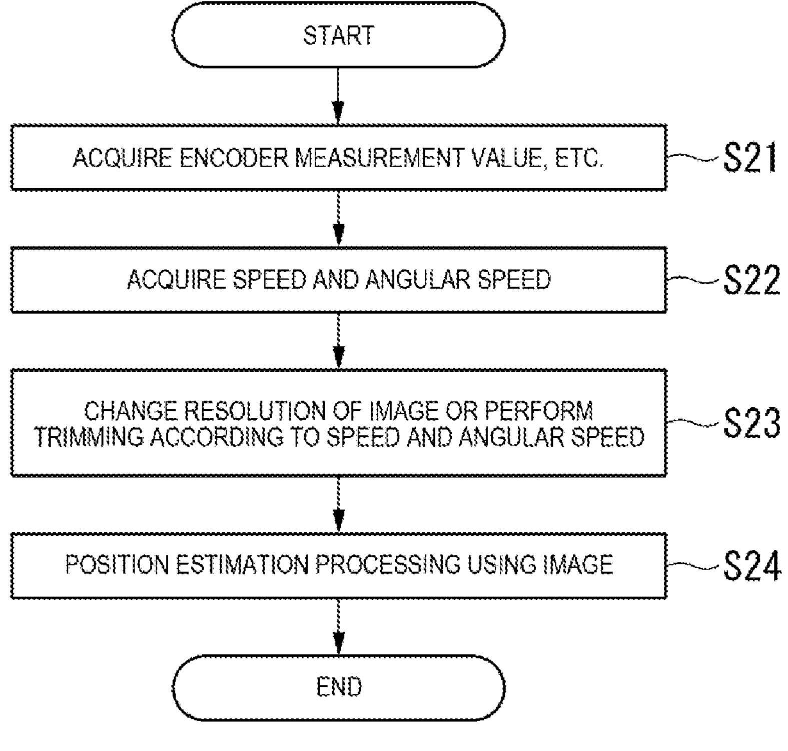
FIG. 6 is a flowchart illustrating an example of load control of image processing according to a third embodiment.

FIG. 6 is a flowchart illustrating an example of load control of image processing according to a third embodiment.

The position estimating device 20 repeatedly performs the following processing in a predetermined control cycle. The load control unit 22 reads and acquires the measurement values of the IMU 10 and the encoder 11 from the storage unit 24 (step S21). The load control unit 22 calculates the speed of the forklift 1 from the acceleration measured by the IMU 10 and the rotational speed of the tire measured by the encoder 11. In addition, the load control unit 22 acquires the angular speed measured by the IMU 10 (step S22). Next, the load control unit 22 changes the resolution of the image or performs trimming according to the speed and the angular speed (step S23). For example, when the speed is equal to or less than a predetermined threshold value, the load control unit 22 reduces the resolution of the image, trims only the middle portion of the image, or performs both of them. In addition, for example, when the angular speed is equal to or more than the predetermined threshold value, the load control unit 22 trims off only the middle portion of the image. Accordingly, it is possible to reduce the load of the image processing of the position estimating unit 23. The reduction in the resolution and the trimming are performed within the range of not adversely affecting the position estimation. For example, a table defining a correspondence relationship between the speed of the forklift 1 and the resolution or the trimming range may be registered in advance in the storage unit 24, and the resolution or the trimming range may be determined based on the table. The load control unit 22 outputs the image having been subjected to the resolution reduction or the trimming to the position estimating unit 23 and instructs the position estimating unit 23 to perform the position estimation processing using the image. The position estimating unit 23 performs the position estimation processing using the image acquired from the load control unit 22 according to the execution instruction of the load control unit 22 (step S24).

Accordingly, it is possible to reduce the load (power consumption) of the image processing in the position estimation processing while ensuring positioning accuracy. The load control of the third embodiment can be combined with those of the first embodiment and the second embodiment.

Fourth Embodiment

Figure 7:
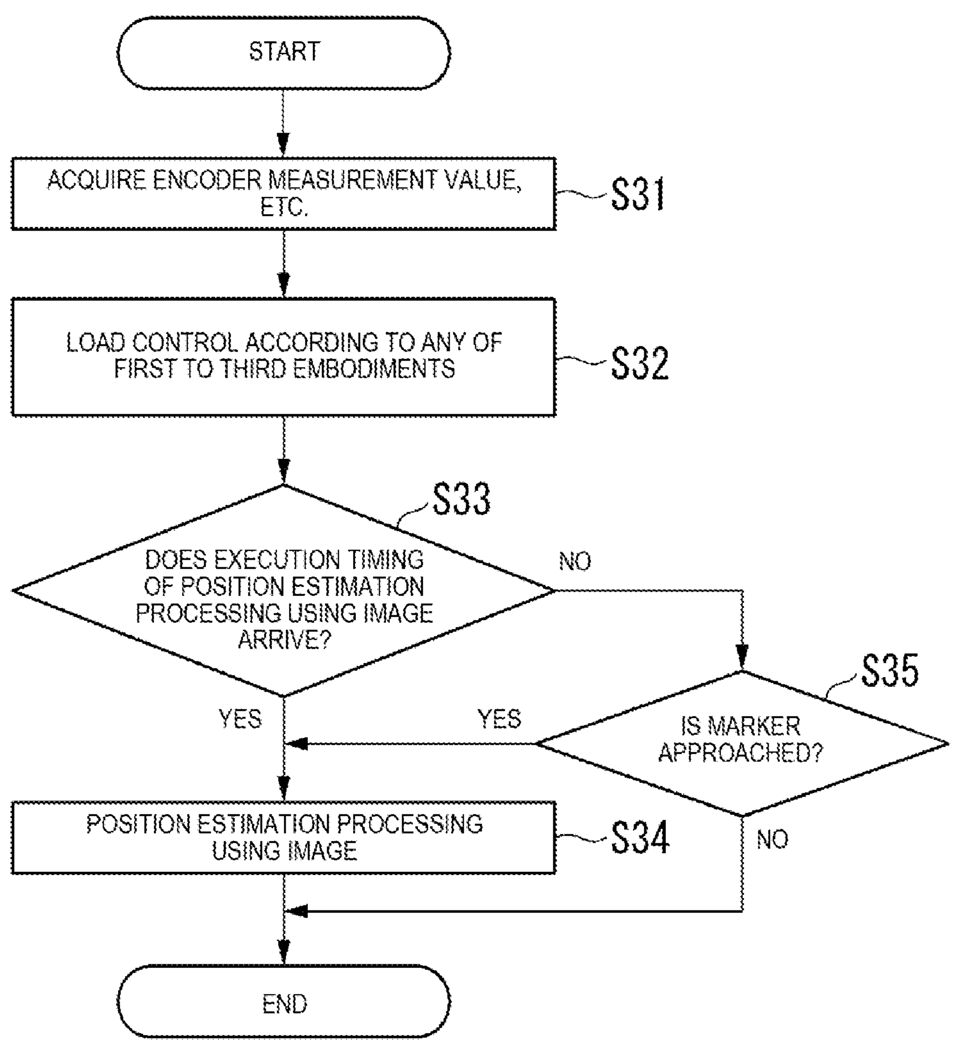
FIG. 7 is a flowchart illustrating an example of load control of image processing according to a fourth embodiment.

FIG. 7 is a flowchart illustrating an example of load control of image processing according to a fourth embodiment.

The position estimating device 20 repeatedly performs the following processing in a predetermined control cycle. The load control unit 22 reads and acquires the measurement values of the IMU 10 and the encoder 11 from the storage unit 24 (step S31). The load control unit 22 performs the load control according to any of the first to third embodiments (step S32). Next, the load control unit 22 determines whether the execution timing of the position estimation processing using the image arrives (step S33). For example, in a case where the load control of the first embodiment is performed, the arrival of the execution timing of the position estimation processing using the image means timing at which the forklift 1 moves a predetermined distance since the position estimation processing using the image has been performed one cycle before. When the execution timing of the position estimation processing using the image arrives (Yes in step S33), the load control unit 22 instructs the position estimating unit 23 to perform the position estimation processing using the image. The position estimating unit 23 performs the position estimation processing using the image according to the execution instruction from the load control unit 22 (step S34). When the timing of the image processing does not arrive (No in step S33), the load control unit 22 determines whether the forklift 1 approaches the marker provided on the ceiling (step S35). For example, the load control unit 22 acquires a position estimation result by dead reckoning from the position estimating unit 23, collates the acquired estimation result with the map data including the information of the marker, and determines whether the marker is present in the surroundings. For example, if an image is captured at the current position and the marker is present in a range of the image captured by the camera 12, the load control unit 22 determines that the marker is approached, and if not, determines that the marker is not approached. When it is determined that the marker is approached (Yes in step S35), the load control unit 22 instructs the position estimating unit 23 to perform the position estimation processing using the image by Method 1. The position estimating unit 23 performs the position estimation processing (Method 1) using the image according to the execution instruction from the load control unit 22 (step S34). When it is determined that the marker is not approached (No in step S35), the load control unit 22 does not instruct the position estimating unit 23 to perform the position estimation processing using the image, and thus the position estimation processing using the image and the image processing accompanying the position estimation processing are not performed in this control cycle.

Accordingly, in addition to the effects of the first to third embodiments, it is possible to further improve the accuracy of the position estimation.

In FIG. 1, the forklift 1 is provided with one camera 12 but may be provided with a plurality of cameras 12. Then, for example, only the minimum number of cameras required to maintain the positioning accuracy may be used according to the speed of the forklift 1, or the load control unit 22 may perform control such that the minimum number of images required to maintain the positioning accuracy are selected from the images captured by the plurality of cameras at the same time and used as processing targets of the position estimation processing using the images. For example, when the forklift 1 moves at a low speed, only one of the plurality of cameras may be used to capture an image, or only one of the images captured by the plurality of cameras 12 may be used as a target of the image processing to reduce consumed power. For example, a table in which the speed and the angular speed of the forklift 1 are associated with the number of cameras and the number of images to be used may be registered in the storage unit 24, and the load control unit 22 may determine the number of cameras and the number of images to be used based on the table.

Figure 8:
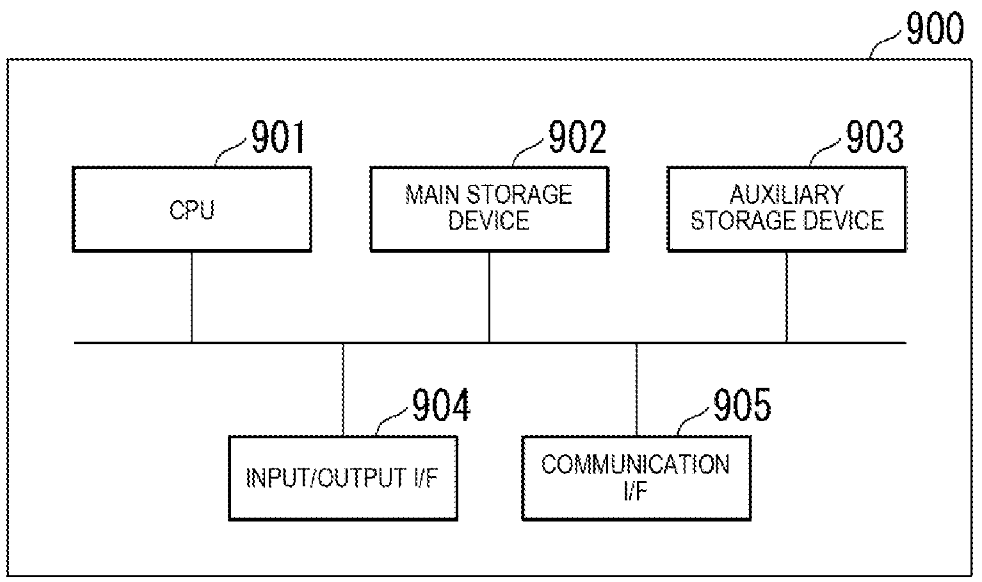
FIG. 8 is a diagram illustrating an example of a hardware configuration of the position estimating device according to each embodiment.

FIG. 8 is a diagram illustrating an example of a hardware configuration of the position estimating device according to each embodiment.

A computer 900 includes a CPU 901, a main storage device 902, an auxiliary storage device 903, an input/output interface 904, and a communication interface 905.

The above-described position estimating device 20 is implemented in the computer 900. The functions described above are stored in the auxiliary storage device 903 in a format of a program. The CPU 901 reads the program from the auxiliary storage device 903, expands the program to the main storage device 902, and executes the above-mentioned processing in accordance with the program. The CPU 901 secures a storage area in the main storage device 902 in compliance with the program. The CPU 901 secures a storage area for storing data under processing in the auxiliary storage device 903 in compliance with the program.

Note that a program for implementing the whole or part of the functions of the position estimating device 20 may be recorded in a computer readable recording medium, and a computer system may be caused to read and execute the program recorded in the recording medium to execute the processing of the respective functional units. The "computer system" here includes hardware such as an operating system (OS) or peripheral equipment. In addition, if a world wide web (WWW) system is used, the "computer system" also includes a home page providing environment (or a display environment). The "computer readable recording medium" refers to a portable medium such as a CD, a DVD, or a USB, or a storage device such as a hard disk built in a computer system. Further, when this program is distributed to the computer 900 through a communication line, the computer 900 receiving the distribution may expand the program to the main storage device 902, and may execute the above-mentioned processing. The above-described program may implement part of the functions described above, and furthermore, also implement the functions described above in combination with a program already recorded in the computer system.

In the foregoing, certain embodiments of the disclosure have been described, but all of these embodiments are merely illustrative and are not intended to limit the scope of the disclosure. These embodiments may be implemented in various other forms, and various omissions, substitutions, and alterations may be made without departing from the gist of the disclosure. These embodiments and modifications are included in the scope and gist of the disclosure and are also included in the scope of the disclosure described in the claims and equivalents thereof.

Supplementary Notes

The position estimating device, the forklift, the position estimating method, and the program described in each embodiment are understood as follows, for example.

(1) A position estimating device according to a first aspect is a position estimating device that estimates a position of a vehicle equipped with a camera and includes a position estimating unit configured to estimate the position of the vehicle by image processing of an image captured by the camera and a load control unit configured to control a processing load of the image processing by controlling an execution timing of the image processing performed by the position estimating unit and/or the image to be subjected to the image processing.

As a result, it is possible to reduce power consumption while ensuring the estimation accuracy of the position.

(2) A position estimating device according to a second aspect is the position estimating device of (1), in which the load control unit causes the position estimating unit to estimate the position based on the image processing every time the vehicle travels a predetermined distance or rotates at a predetermined angle.

Appropriately setting the predetermined distance or the predetermined angle makes it possible to reduce power consumption while ensuring the estimation accuracy of the position.

(3) A position estimating device according to a third aspect is the position estimating device of (1), in which the load control unit changes, according to a speed and/or an angular speed of the vehicle, the number of images to be subjected to the image processing by the position estimating unit per unit time.

Appropriately changing the number of processed images makes it possible to reduce power consumption while ensuring the estimation accuracy of the position.

(4) A position estimating device according to a fourth aspect is the position estimating device of (3), in which the load control unit calculates the number of images by an equation below:

the number of images=$\alpha\times$(the speed of the vehicle)+$\beta\times$(the angular speed of the vehicle), where $\alpha$ and $\beta$ are any given coefficients.

Thus, it is possible to calculate the number of processed images that can reduce power consumption while ensuring the estimation accuracy of the position.

(5) A position estimating device according to a fifth aspect is the position estimating device of any one of (1) to (4), in which the load control unit changes, according to a speed or an angular speed of the vehicle, a resolution of the image to be subjected to the image processing by the position estimating unit and/or a size of a processing target region in the image to be subjected to the image processing (for example, trimming only the middle portion).

Thus, it is possible to control the load of the image processing so as to reduce power consumption while ensuring the estimation accuracy of the position.

(6) A position estimating device according to a sixth aspect is the position estimating device of any one of (1) to (5), in which when a plurality of the cameras is provided, the load control unit changes, according to a speed or an angular speed of the vehicle, the number of images to be subjected to the image processing of a plurality of the images captured by the plurality of the cameras.

When the plurality of the cameras is provided, the load of the image processing can be controlled by changing the number of images to be subjected to the image processing of the images captured by the plurality of the cameras.

(7) A position estimating device according to a seventh aspect is the position estimating device of any one of (1) to (6), in which the load control unit causes the position estimating unit to estimate the position based on the image processing regardless of a load of the image processing when the vehicle approaches an installation position of a marker serving as a mark for position estimation.

This can guarantee the accuracy of the position estimation.

(8) A forklift according to an eighth aspect includes the position estimating device of (1) to (7) and a camera.

(9) A position estimating method according to a ninth aspect is a position estimating method of estimating a position of a vehicle equipped with a camera and includes controlling, when position estimation is performed by image processing of an image captured by the camera, a load of the image processing by controlling an execution timing of the image processing and/or the image to be subjected to the image processing and estimating the position of the vehicle by the image processing of the image based on control of the load.

(10) A program according to a tenth aspect causes a computer that estimates a position of a vehicle equipped with a camera to function as a unit configured to estimate the position of the vehicle by image processing of an image captured by the camera and a unit configured to control a processing load of the image processing by controlling an execution timing of the image processing performed by the unit configured to estimate the position and/or the image to be subjected to the image processing.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A position estimating device that estimates a position of a vehicle equipped with a camera, the position estimating device comprising:

processing circuitry configured to estimate the position of the vehicle by image processing of an image captured by the camera, the image processing including collating a marker included in the image with map data with information of the marker; and control a processing load of the image processing by controlling an execution timing of the image processing performed by the position estimating unit and/or the image to be subjected to the image processing, wherein the processing circuitry is configured to control the execution timing of the image processing by causing estimating the position of the vehicle every time when the vehicle travels a predetermined distance or rotates at a predetermined angle, and wherein the processing circuitry is configured to cause the position estimating unit to estimate the position based on the image processing regardless of a load of the image processing when the vehicle approaches an installation position of a marker serving as a mark for position estimation.

2. The position estimating device according to claim 1, wherein when a plurality of the cameras is provided, the processing circuitry is configured to change, according to a speed or an angular speed of the vehicle, the number of images to be subjected to the image processing of a plurality of the images captured by the plurality of the cameras.

3. A forklift, comprising:

a camera; and a position estimating device described in claim 1.

4. A position estimating method of estimating a position of a vehicle equipped with a camera, the position estimating method comprising:

controlling, when position estimation is performed by image processing of an image captured by the camera, a load of the image processing by controlling an execution timing of the image processing and/or the image to be subjected to the image processing; and estimating the position of the vehicle by the image processing of the image based on control of the load, the image processing including collating a marker included in the image with map data with information of the marker, wherein the controlling the execution timing of the image processing includes causing estimating the position of the vehicle every time when the vehicle travels a predetermined distance or rotates at a predetermined angle, and wherein estimating the position is processed based on the image processing regardless of a load of the image processing when the vehicle approaches an installation position of a marker serving as a mark for position estimation.

5. A non-transitory computer readable storage medium storing a program for causing a computer that estimates a position of a vehicle equipped with a camera to:

estimate the position of the vehicle by image processing of an image captured by the camera, the image processing including collating a marker included in the image with map data with information of the marker; and control a processing load of the image processing by controlling an execution timing of the image processing performed by the unit configured to estimate the position and/or the image to be subjected to the image processing, wherein the controlling the execution timing of the image processing includes causing estimating the position of the vehicle every time when the vehicle travels a predetermined distance or rotates at a predetermined angle, and wherein estimating the position is processed based on the image processing regardless of a load of the image processing when the vehicle approaches an installation position of a marker serving as a mark for position estimation.

* * * * *